Feb. 8, 1927.
P. W. FORSBERG
1,617,151
REGENERATIVE BRAKING CONTROL
Filed June 2, 1926
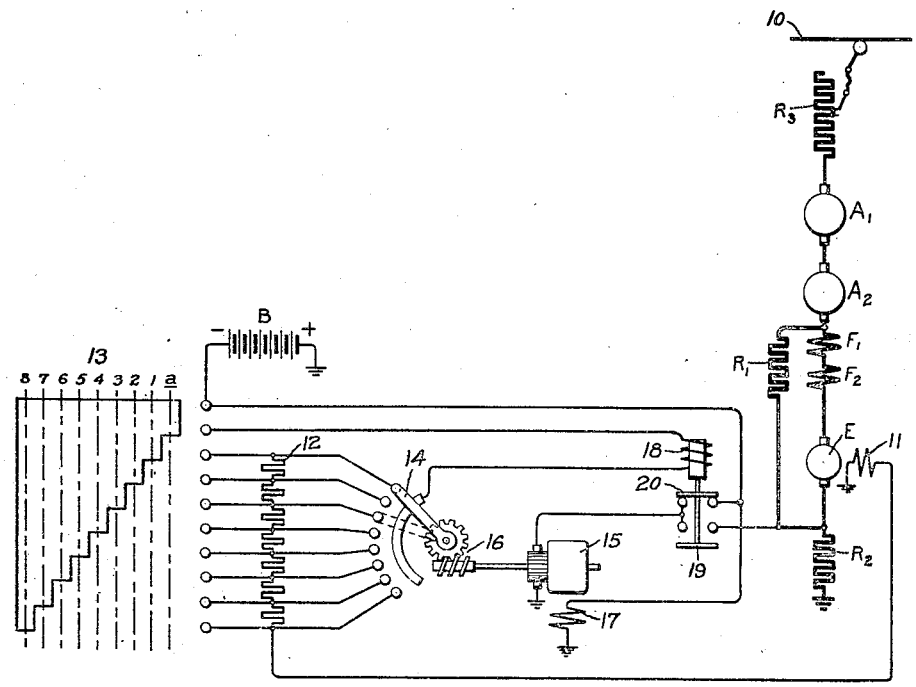
Inventor:
Peter W. Forsberg;
by *Alexander S. Lunt*
His Attorney.

Patented Feb. 8, 1927.

1,617,151

UNITED STATES PATENT OFFICE.

PETER W. FORSBERG, OF SCHENECTADY, NEW YORK, ASSIGNOR TO GENERAL ELECTRIC COMPANY, A CORPORATION OF NEW YORK.

REGENERATIVE BRAKING CONTROL.

Application filed June 2, 1926. Serial No. 113,328.

The invention relates to the control of regenerative braking operation of electric motors and has for its object the provision of improved means for initiating and regulating the braking operation of the motors.

More specifically the invention provides an improved automatic control arrangement for maintaining the motor voltage substantially equal to the line voltage during the establishment of regenerative braking conditions. Thereafter the automatic control may be rendered inactive and the voltage of the motors regulated at will to attain any desired regenerative braking effect. Furthermore, by means of the present invention the control of the regenerative braking effect may be accomplished by means of a manually operated controller having a plurality of definite operating positions which correspond substantially to different braking conditions.

While the invention is not limited thereto, it is particularly advantageous in controlling the regenerative braking operation of a direct current electric locomotive as the automatic arrangement for controlling the motor voltage permits coming into regenerative braking with small attention on the part of the operator and, with definite positions on the manually operated braking controller, the operator is able to accurately adjust the regenerative braking effect to a value suitable for any grade.

In carrying the invention into effect in a preferred form of direct current locomotive control system, a separate exciter is provided for supplying exciting current to the field windings of the locomotive driving motors of the proper value to cause the motors to return regenerated braking current to the power source. The exciter is provided with a separately excited field winding and the driving motor voltage and, consequently, the regenerated current of the driving motors, is controlled by varying the excitation of the exciter field winding. In order to automatically maintain the driving motor voltage substantially equal to the line voltage during establishment of regenerative braking conditions as well as during transition from motoring operation to regenerative braking operation, I provide a motor operated controller for automatically controlling the excitation of the exciter field. A resistor is connected in the motor braking circuit and the motor-operated controller is arranged to be operated automatically in accordance with the voltage drop across the resistor during the establishment of regenerative braking conditions. The arrangement is such that when a motoring current flows through the resistor, the exciter field excitation is increased and when a regenerated braking current flows through the resistor the exciter field excitation is decreased. Thus, the motor-operated rheostat serves to automatically vary the exciter field excitation so as to maintain the voltage of the motor substantially equal to the line voltage. Under these conditions neither motoring nor regenerative braking current flows through the regulating resistor. After the usual current limiting resistors are removed from the motor circuit, a suitable braking controller having a plurality of operating positions is arranged to render the motor-operated controller inactive and assume independent control of the excitation of the exciter field winding and thereby regulate the regenerative braking effect of the motors to meet any service conditions encountered.

In the accompanying drawing, the single figure is a simplified circuit diagram of a regenerative braking control system for a direct current locomotive embodying a preferred form of the invention.

In the drawing, the locomotive driving motors are shown as of the direct current series type having armatures $A^1$, $A^2$, and corresponding series field windings $F^1$, $F^2$. The motors are arranged to be connected through the agency of suitable switch mechanism to receive energy from the power source 10 for motoring operation and to return energy thereto during regenerative braking operation. The switch mechanism for establishing the series and parallel operating relations of the motors as well as controlling the power connections during both motoring and regenerative braking operation may be of any well-known form and, hence, is not shown in detail in the drawing.

Regenerative braking operation of the motors is accomplished by connecting the exciter E to supply excitation to the field windings $F^1$, $F^2$, of the motors through a local circuit formed by the resistor $R^1$ in a manner well known in the art. The braking stabilizing resistor $R^2$ is connected in the motor circuit and the usual variable current limiting resistor $R^3$ is provided for maintaining both the motoring and the regenerative braking current of the motors within desired limits during initiation of either motoring or braking operation of the motors. The resistor $R^3$ is removed from the motor circuit to accelerate the motors to normal running speed, as well as to establish normal regenerative braking conditions.

The exciter field winding 11 is separately excited from the battery B and the excitation of the exciter is controlled by the regulating resistor 12, which is arranged to be controlled by both the manually operable controller 13 and the motor-operated controller 14. The controller-operating motor 15 is of the separately excited type and is connected through the worm gearing 16 or in any other suitable way to operate the controller 14 to control the insertion of the successive sections of the resistor 12 in the exciter field circuit. With the manually operable controller 13 in position $a$, the separately excited field winding 17 of operating motor 15 is arranged to be energized from the battery B, and the armature of the motor 15 is connected through the agency of the electromagnetic switch 18 to be energized in accordance with the voltage drop across the stabilizing resistor $R^2$. When the electromagnetic switch 18 is deenergized both the field and the armature of the operating motor 15 are energized from the battery B in such direction that the controller 14 is operated to an inactive position.

It will be understood that the exciter E, the braking controller 13, and the motor-operated controller 14 are not used during normal motoring operation of the motors $A^1$, $A^2$. However, when it is desired to initiate regenerative braking operation, the motors $A^1$, $A^2$ are connected to the power source 10 through stabilizing resistor $R^2$ and the current limiting resistor $R^3$ with the exciter E in the motor circuit as indicated diagrammatically in the drawing.

With the field winding 11 of the exciter E unenergized, the motors $A^1$, $A^2$ receive current from the power source 10 and start operation at the minimum motoring speed. The braking controller 13 then is advanced into position $a$ in which a circuit is established through the operating winding of the electromagnetic switch 18, the regulating resistor 12, and the field winding 11 of exciter E. Since all of the sections of the regulating resistor 12 are included in the exciter field excitation circuit, the exciter E supplies minimum excitation to the field windings $F^1$, $F^2$, and the motors $A^1$, $A^2$ may continue to receive motoring current from the power source 10. As the operating winding of electromagnetic switch 18 is energized by the exciting current supplied to the field winding 11, the switch contact 19 operates to connect the armature of motor 15 to be energized in accordance with the voltage drop across the stabilizing resistor $R^2$. With a motoring current flowing through resistor $R^2$, the armature of motor 15 is energized with a current flowing in such direction that the motor operates the controller 14 to remove the successive sections of the regulating resistor 12 from the excitation circuit of the exciter field winding 11, thereby increasing the exciting current. This results in an increased excitation in the motor field windings $F^1$, $F^2$ from the exciter E, and eventually the motor voltage is increased until it is substantially equal to the voltage of the power source 10. Under these conditions, the motors no longer receive motoring current from the source 10.

In case the excitation of the motor field windings $F^1$, $F^2$ is increased sufficiently to raise the motor voltage above that of the source 10, the motors then supply regenerated current to the power source 10. As the regenerated current flows through the stabilizing resistor $R^2$ in the reverse direction from the motoring current, the armature of operating motor 15 is energized in the reverse direction. Consequently, motor 15 automatically operates the controller 14 in such direction as to reinsert the successive sections of regulating resistor 12 in the exciter field circuit. This reduces the excitation supplied to the motor field windings $F^1$, $F^2$, and thereby reduces the regenerated voltage of the motors to substantially that of the power source 10. Thus, it will be seen that the operating motor 15 automatically operates the controller 14 to vary the regulating resistor 12 in such a way as to maintain the voltage of motors $A^1$, $A^2$ substantially equal to the voltage of the power source 10 and thereby prevent either a motoring or a regenerative braking current from flowing through the motor circuit including the stabilizing resistor $R^2$.

Let us assume that after the motor 15 has operated the controller 14 into the position indicated by the dotted lines in the drawing, the excitation of exciter E and the resulting excitation of the motor field windings $F^1$, $F^2$ is just sufficient to balance the motor voltage with that of the line. While the voltage of motors $A^1$, $A^2$ is maintained substantially equal to that of the line, the current limiting resistor $R^3$ may be removed from the motor circuit without any possibility of an excessive motoring or regenerative braking current flowing in the motor circuit.

The motor excitation now may be increased sufficiently to produce a desired regenerative braking effect, by advancing the manually operated controller 13 into one of its operative positions in which more sections of the regulating resistor 12 are removed from the exciter field excitation circuit. Let us assume that the operating conditions require a braking effect of the motors which corresponds roughly with position 6 of the manually operated controller 13. Upon operation of the controller 13 to position 6, the motor-operated controller 14 is automatically rendered inactive and the controller 13 thereafter assumes independent control of the regulating resistor 12. This is accomplished by reason of the fact that in position 3 of controller 13 the operating winding of electromagnetic switch 18 is effectively short circuited. Upon the resulting opening of the switch 18 in accordance with its bias the armature of operating motor 15 is energized through the switch contact 20 from the battery B in such direction that the motor 15 returns the controller 14 to the initial or inactive position in which it is shown in the drawing, wherein the motor 15 stalls. Consequently, the manual controller 13 now has exclusive control of the regulating resistor 12 and may be operated into any of its positions 1 to 8 to control the regenerative braking effect of the motors $A^1$, $A^2$, without interference with the motor-operated controller 14.

Thus, it will be seen that in accordance with the present invention the excitation of the motors $A^1$, $A^2$ is automatically controlled by the operating motor 15 and the controller 14 so as to automatically maintain the motor voltage substantially equal to the line voltage while the current limiting resistor $R^3$ is being removed from the motor circuit. Thereafter the control arrangement permits the manually operable braking controller 13 having a plurality of operative positions corresponding to different braking effects of the motors to be operated into a selected position and thereafter assume complete control of regenerative braking operation.

While I have illustrated and described the preferred embodiment of the invention, it will be understood that the arrangement shown may be modified without departing from the spirit and scope of the invention.

What I claim as new and desire to secure by Letters Patent of the United States, is:

1. In a regenerative braking motor control system, the combination of a motor, means for exciting the motor for regenerative braking operation, and electroresponsive means energized in accordance with the direction of flow of both motoring and regenerative braking current therein, and operable in a corresponding direction to control the excitation of the motor to neutralize a flow of either motoring or braking current.

2. In a regenerative braking motor control system, the combination of a motor, means for exciting the motor for regenerative braking operation, a second motor connected in circuit with said first motor for operation in a direction corresponding to the direction of flow of either motoring or regenerative braking current, and means controlled by said second motor for varying the excitation of the first motor to prevent a flow of current in either the motoring or braking direction.

3. In a regenerative braking motor control system, the combination of a motor, a resistor in circuit therewith, means for exciting the motor for regenerative braking operation, a reversible motor connected to be operated in a direction corresponding to the direction of flow of both motoring and regenerative braking current through said resistor, and means automatically controlled by said reversible motor for increasing the excitation of the first motor upon a flow of motoring current through said resistor and for decreasing the excitation of the motor upon a flow of regenerated current through said resistor.

4. In a regenerative braking motor control system, the combination of a direct current motor, a resistor connected in the armature circuit of said motor, means for exciting the field windings of the motor for regenerative braking operation, a separately excited reversible motor having its armature connected to be operated in a direction corresponding to the direction of current flow through said resistor, and means under the control of said reversible motor for varying the excitation of the first motor to prevent a flow of both motoring and regenerative braking current through said resistor.

5. In a regenerative braking motor control system, the combination of a direct current motor, an exciter for supplying excitation to the field winding of the motor for regenerative braking operation, a resistor connected in circuit with the motor for limiting both the motoring and the regenerated braking current thereof, a separately excited reversible motor having its armature connected to be operated in a direction corresponding to the direction of current flow through said resistor, and means under the control of said separately excited motor for controlling the voltage of the exciter to neutralize the flow of both motoring and regenerated braking current through said resistor.

6. In a regenerative braking motor control system, the combination of a motor, automatic means for controlling the motor excitation to prevent both motoring and regenerative braking operation thereof, and means for rendering the said automatic means ineffective and for independently controlling the excitation of the motor to obtain regenerative braking operation thereof.

7. In a regenerative braking motor control system, the combination of a motor, means for connecting the motor to a power source for motoring operation and for supplying excitation to the motor for regenerative braking operation, automatic electroresponsive means for controlling the motor excitation to maintain the regenerated voltage of the motor substantially equal to the voltage of the power source and thereby prevent both motoring and regenerative braking operation, and means for rendering said automatic means ineffective and for independently controlling the motor excitation to increase the regenerated voltage of the motor above the voltage of the power source for regenerative braking operation.

8. In a regenerative braking motor control system, the combination of a motor, an exciter for supplying excitation to the motor for regenerative braking operation thereof, automatic means responsive to the current through the motor for controlling said exciter to prevent both motoring and regenerative braking operation of the motor, and manually operable means for rendering said automatic means ineffective and independently controlling the said exciter to vary the regenerative braking effect of the motor.

9. In a regenerative braking motor control system, the combination of a motor, means including a resistor for controlling the excitation of the motor to produce either motoring or regenerative braking operation thereof, automatic electroresponsive means energized in accordance with the current to the motor and arranged to control the resistor to neutralize a flow of both motoring and regenerative braking current, and manually operable means for rendering said automatic means ineffective and independently controlling the said resistor to cause regenerative braking operation of the motor.

10. In a regenerative braking motor control system, the combination of a motor adapted to be connected to a power source for both motoring and regenerative braking operation, means including a resistor for controlling the excitation of the motor to cause either motoring or regenerative braking operation thereof, means for controlling said resistor comprising a manually operable controller having a plurality of operative positions, an electrically operated controller having a plurality of operative positions, a switch mechanism controlled by said manually operable controller in one position thereof for connecting said electrically operated controller to be energized in accordance with the current in the motor circuit to automatically control said resistor to prevent a flow of either motoring or regenerative braking current, and connections whereby upon operation of the manual controller to another position, the said electrically operated controller is rendered ineffective and the said resistor is placed under the independent control of said manual controller.

11. In a regenerative braking motor control system, the combination of a direct current series motor adapted to be connected to a power source for both motoring and regenerative braking operation, a current limiting resistor in circuit with the motor, a separately excited exciter connected in the motor circuit for increasing the field excitation of the motor for regenerative braking operation, a resistor for controlling the separate excitation of the exciter, a motor operated rheostat for controlling said resistor and having the operating motor thereof normally connected to insure minimum excitation of the exciter, a manual controller for independently controlling said resistor, switch mechanism under the control of said controller for connecting the rheostat operating motor to be energized in accordance with the motoring and regenerative braking current of said first motor for operation of the rheostat to neutralize a flow of both motoring and regenerative braking current, and connections controlled by said controller through which the said switch mechanism is operated to reestablish the normal energization of the rheostat operating motor and the said resistor is independently controlled by the said manual controller to cause regenerative braking operation of the direct current series motor.

12. The combination with a resistor, of a controller having a plurality of operative positions for controlling said resistor, a second controller having a plurality of operative positions for controlling said resistor, and electroresponsive means controlled by one of said controllers and arranged to operate the other controller to control said resistor in accordance with predetermined conditions when said one controller is in a predetermined position and to operate said other controller to an inactive position when said one controller is operated to another position and thereby place said resistor under the independent control of said one controller.

13. The combination with a resistor, of a pair of independently operable controllers for controlling said resistor, electroresponsive means for automatically operating one of said controllers in accordance with predetermined conditions, and connections controlled by the other controller upon operation thereof to a position corresponding to the position of the automatically operated controller for effecting operation of the automatically operated controller to an inactive position to permit exclusive control of the resistor by said other controller.

14. The combination with a resistor, of a pair of controllers, each independently operable to control said resistor, electroresponsive means for automatically operating one of the controllers in accordance with predetermined conditions, and switch mechanism controlled by the other controller upon operation thereof to a position corresponding to the position of the automatically operated controller for energizing said electroresponsive means to operate the controller associated therewith to an inactive position to permit exclusive control of the resistor by the other controller.

15. The combination with a resistor having connections brought out from intermediate sections thereof, a controller for successively connecting the sections of said resistor in a circuit, electroresponsive means for operating said controller in accordance with predetermined conditions, a second controller for independently connecting the successive sections of the resistor in the circuit, and an electro-responsive switch under the joint control of said controllers upon operation thereof to connect corresponding sections of the resistors in the circuit for energizing said electroresponsive means to operate the said first controller to an inactive position.

16. The combination with a resistor, of a motor operated controller for automatically controlling the resistor in accordance with predetermined conditions, a manually operable controller for controlling the resistor, and switch mechanism controlled by the manually operable controller in one position thereof for placing the resistor under the control of the motor operated controller and for automatically controlling the motor operated controller to cause operation thereof to an inactive position when the manual controller is operated to independently control the resistor.

17. The combination with a resistor having connections brought out from a plurality of intermediate sections thereof, a pair of controllers, each independently operable to establish a circuit through the successive sections of the resistor, an electric motor for automatically operating one of said controllers in accordance with predetermined conditions when the other controller is in an inactive position, an electroresponsive switch arranged to be connected in circuit with the successive sections of said resistor for controlling said electric motor, and connections whereby the operating winding of said switch is short circuited upon operation of the other controller to a position corresponding to that of the automatically operated controller to render the automatic controller ineffective and thereby permit exclusive control of the resistor by said other controller.

18. The combination with a resistor having a plurality of sections, a pair of controllers independently operable to control the insertion of the successive sections of said resistor in a circuit, a separately excited electric motor for operating one of said controllers in accordance with predetermined conditions, and switch mechanism normally biased to connect said separately excited motor to a source of supply for operation of the controller associated therewith to an inactive position, and connections jointly controlled by said controllers for energizing the said electromagnetic switch to render the said separately excited motor responsive to predetermined conditions when said other controller is in an inactive position and for deenergizing said electromagnetic switch to permit exclusive control of the resistor by said other controller upon operation thereof to a position corresponding to that of said motor operated controller.

In witness whereof, I have hereunto set my hand this eleventh day of May 1926.

PETER W. FORSBERG.